United States Patent [19]

Acker

[11] 3,873,973

[45] Mar. 25, 1975

[54] SELF-CORRECTING READING OF CONTRAST INFORMATION

[75] Inventor: Norbert K. Acker, Buchschlag, Germany

[73] Assignee: Scanner, Inc., Houston, Tex.

[22] Filed: June 8, 1973

[21] Appl. No.: 368,238

[52] U.S. Cl. .......................................... 340/146.3 Z

[51] Int. Cl. .......................................... G06k 9/18

[58] Field of Search .............. 340/146.3 Z, 146.3 C, 340/146.3 K, 146.3 Y, 146.3 AE; 235/61.11 E

[56] References Cited

UNITED STATES PATENTS

| | | | |
|---|---|---|---|
| 3,167,742 | 1/1965 | Miller | 340/146.3 AG |
| 3,246,293 | 4/1966 | Shelton, Jr. | 340/146.3 C |
| 3,391,387 | 7/1968 | Flores | 340/146.3 C |
| 3,744,025 | 7/1973 | Bilgutay | 340/146.3 Z |
| 3,758,752 | 9/1973 | Kapsambelis et al. | 340/146.3 Z |

*Primary Examiner*—Gareth D. Shaw
*Assistant Examiner*—Leo H. Boudreau
*Attorney, Agent, or Firm*—Ralf H. Siegemund

[57] ABSTRACT

Data fields are read by an optical scanning process, wherein the read signals are processed to simulate reading in opposite directions. The processing permits gaining proper read results even in case of heavily soiled labels and mutilated characters.

12 Claims, 8 Drawing Figures

PATENTED MAR 25 1975 3,873,973

SELF-CORRECTING READING OF CONTRAST INFORMATION

BACKGROUND OF THE INVENTION

The present invention relates to the processing of information as it has been read from a record carrier having a data field with contrasting markings.

Items of merchandise, packages, cards, etc., are sometimes identified by a data field affixed to the item and containing relevant information about the item to be identified in that manner. The data field may comprise a label with data markings printed thereon. Labels of that type are shown, for example, in copending patent application Ser. Nos. 278,468 filed Aug. 7, 1972, now U.S. Pat. No. 3,801,775; 284,733 filed Aug. 30, 1972 and now abandoned; 303,507 filed Nov. 3, 1972, and 165,078 filed July 23, 1971, now U.S. Pat. No. 3,800,282, or in U.S. Pat. Nos. 3,600,556 and 3,684,867. These labels generally comprise a, e.g., light background with particular contrasting, e.g., dark markings printed thereon. The markings have particular characteristics, and reference is made specifically here to Ser. Nos. 165,078 and 278,468. These applications as well as the present application have common assignee.

A data field of such type is read for example through a photoelectric or vidicon type scanning process in which a line-for-line scanning raster field is made to cover the data field. A video signal is obtained pursuant to the scanning process, and relevant information is extracted therefrom (see, for example, copending application Ser. No. 299,060 filed Oct. 19, 1972).

Problems arise if the data field itself is, for example, not completely clean or if the markings have been imperfectly printed with too little or too much ink. These defects are, of course, represented as modulations of and in the video signal, making it difficult to extract the desired information from the signal. The said application Ser. No. 299,060 deals with the problem of eliminating some of these unwanted "noise" like modulations. The present invention deals with more severe imperfections which may actually obliterate in one way or another the contrasting information. Dirt spots or misprints may actually simulate markings or eliminate them or cause them to grow together. These defects may lead to incorrect read-outs, simulation of erroneous markings, ambiguities and other errors.

SUMMARY OF THE INVENTION

It is an object of the present invention to process the read information obtained as a result of scanning a data field having contrasting markings so as to extract partially obliterated information therefrom.

It is a feature of the present invention to process the video signal resulting from such a scanning process, in that the leading edges and the trailing edges of data markings are processed separately, at least in parts as to the character assembly decoding and re-encoding process. In the preferred form of practicing the invention, the data markings are organized in characters in that a fixed number of markings per character is distributed in a fixed number of possible positions. These positions are arranged along two tracks with, e.g., three positions in one track and three corresponding positions in a second track parallel to the first track.

As the data field is scanned, the information markings along two different tracks are detected separately by at least one separate scanning line per track. The resulting readout signals must be assembled as to each character which means that representations of markings pertaining to the same character must be mutually associated to obtain complete representation of each character. This character assembly, or the approach thereto, is carried out separately for representations of leading and trailing edges of the markings or of contrast edges that may be markings. Separate processing of leading and trailing edges makes it possible either to recognize falsifying obliteration or to reconstruct correct information. This way, a single pass across the data markings is actually analogous to two passes in opposite directions. Such oppositely oriented reading complicates matters and slows the system down. It was found that the number of faulty readings and rejections of characters for one reason or another is considerably reduced if the result of single direction reading is evaluated on the basis of such forward and reverse simulation.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1, 2, 2A, 2B, 3, 4, 5, 6:
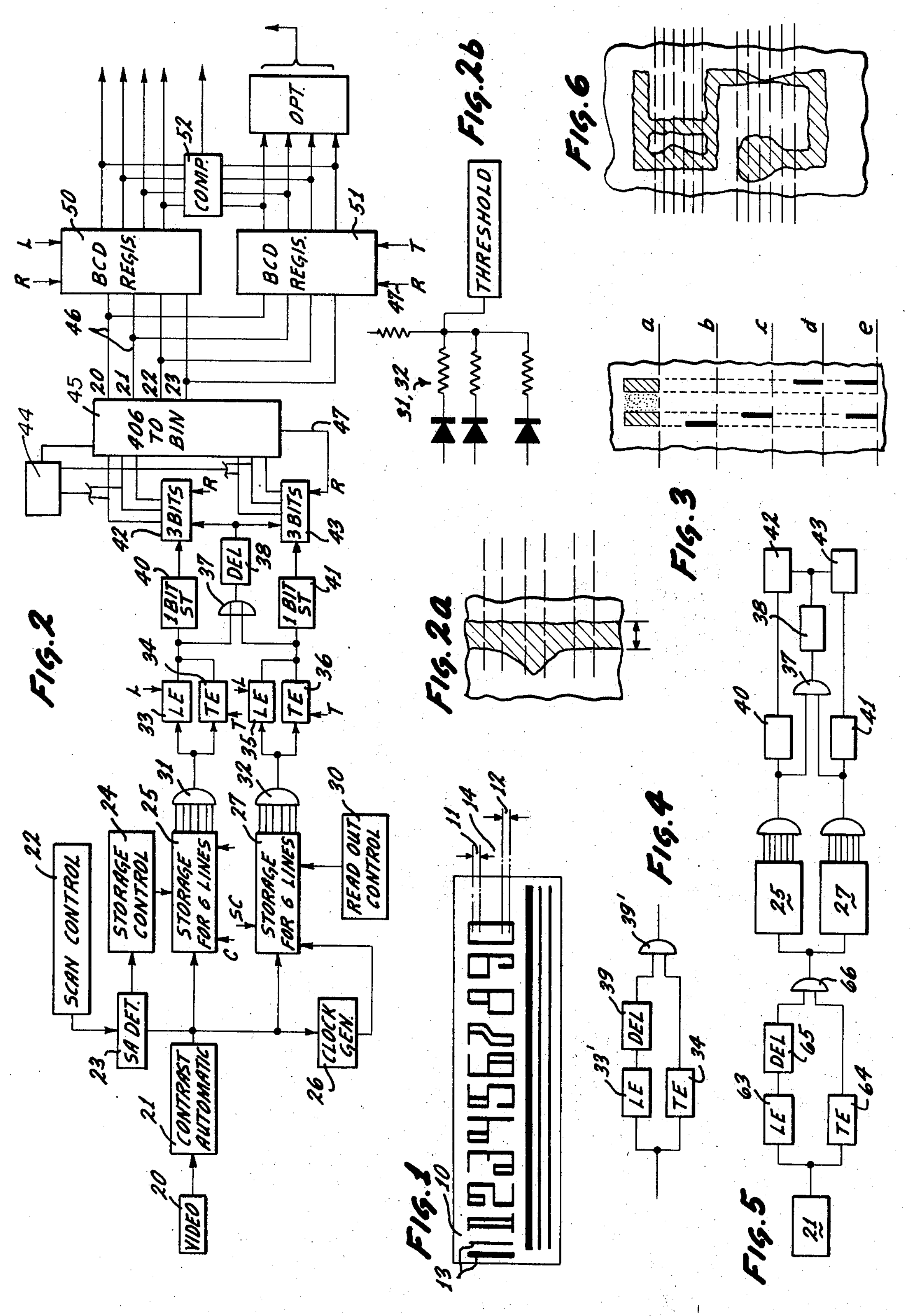
FIG. 1 is a representative example for a data label to be read.
FIG. 2 is a block diagram for a first example of the preferred embodiment of the invention.

FIG. 2*a* is an enlarged view of a portion of a character showing a possible error situation as to reading;

FIG. 2*b* is a schematic circuit detail of FIG. 2;

FIG. 3 is a pulse diagram in line/space alignment with a schematic representation of a portion of a character;

FIG. 4 is a modification or supplement for FIG. 2;

FIG. 5 is another example of the preferred embodiment of the invention or a modification or supplement of FIG. 2; and FIG. 6 is an enlargement of a character with several print faults and superimposed scanning lines.

Proceeding now to the detailed description of the drawings, FIG. 1 illustrates representatively a data field to be scanned and read out. The data field is established by a label 10 onto which are printed characters which are human readable. The characters are composed of dark markings arranged in two tracks 11 and 12. Each character is composed of four markings distributed in six positions. The markings are (in direction of track extension) about as thick as the intracharacter spacing between two markings or the same character it disposed in two sequential positions thereof. The code used is also termed 406 code and the particular representation of the decimal characters permits calling them 406 characters.

These four vertical markings per character are supplemented by contrasting lines outside the track space 11 and 12 to complete them as far as the human readability feature is concerned. These include transverse connection lines in the in-between track space as well as such transverse lines above and below the track space.

The data field may have a position identification character permitting detection of the location and extension of the data field in a separate scanning process.

For reasons which will become apparent below, each track such as 11 and 12 is actually traversed by a plurality of, e.g., six scanning lines during readout. In other words, the the tracks are significantly wider than a single scanning line and, for reasons of redundancy, each track is scanned six times with latteral offset for each scan commensurate with the transverse progression of sequential scanning lines in a raster scan. The middle portion 14 between the tracks is also scanned, because it is simpler to have the scanning field progress regularly, but the video signal produced pursuant to scanning this middle portion of the data field is suppressed.

Turning now to FIG. 2, reference numeral 20 denotes the video pick-up and preamplifier portion, developing a video signal train during scanning. The video signal is processed by a contrast automatic 21 of the type disclosed in copending application Ser. No. 299,060, of common assignee. The circuit 21 converts the video signal into a pulse train identifying the dark markers by a particular signal level, and the background is represented by a different signal level. As a consequence, the signal train as derived from circuits 21 is quite equivalent to a train of bivalued bits.

The scan control is designated generally by circuit 22 and may be provided, as disclosed for example in my copending application Ser. No. 278,468, as well as in Ser. No. 284,733 of common assignee. The scanning process commences always somewhat to the left of the start/alignment character 13 (FIG. 1). As the scanning process proceeds along a line in direction to the right from the starting point, the scanning spot soon traverses start/alignment character 13. The video signal as developed and processed in circuits 20–21 is continually fed to the start/alignment character decoder 23. That circuit 23 responds to a particular bit pattern as produced when the scanning spot traverses the start/alignment character 13. The video signal is ignored otherwise until the decoder 23 has responded, because any signal prior to the decoding is not recognized as data, but any signal thereafter is.

The decoder 23 triggers a storage control circuit 24 which causes the digitized video signal as developed after recognition and detection of an S/A character to be set into a storage facility 25.

The storage facility 25 is composed of, for example, six shift registers which are prepared for receiving trains of digital signals, one register per train, whereby each register is associated with one scanning line. In other words, after the S/A character has been detected pursuant to scanning along the upper portion of the upper track, the first register of facility 25 receives the digital signals which are produced during the scan of that one line. As the scanning line retraces, the next register is enabled, and after the S/A character has been detected again, the second register receives the digital signals of the second scan line, etc.

If the characters are all printed properly, and if no dirt spot simulates a marker along the upper track portion, then the data trains as fed into the six registers should all be identical, and similar bits should be stored in corresponding positions of the registers.

The shift registers are actually operated in response to a clock, derived from the signal from contrast automatic 21. The clock may be constructed in that, e.g., for each leading edge and for each trailing edge two differently delayed clocks are produced, the delays being equal to the bar width and twice the bar width, and all pulses are OR'd, so that in fact a regular train of clock pulses is produced, because the maximum permissible width of spacing in the data field is equal to three bar widths. Alternatively, the system may run on an external clock running at a higher frequency than the marker-space passage rate on scanning. This way, the contrast information is somewhat finer digitized.

The scan control circuit 22 resets the decoder 23 after each scanning line, as decoding of the S/A character is needed for evaluating the video signal for each scanning line and for obtaining proper bit position alignment among the six registers. The storage control 24 may include a counter, counting six sequential S/A detections, and for the duration of counting each S/A detection is permitted to ready the respective next register of storage facility 25.

After six passes across the data field by six scanning lines, several scanning lines are skipped as to readout, i.e., the circuit 24 no longer enables the registers 25. The counter in unit 24 counts again a number of S/A detections, but inhibits readying of any register for these paths and scanning lines. After as many scanning lines as needed to cover the in-between track zones have been counted, a second set of six registers 27 is enabled, and thereafter one register per scanning line is enabled for the next passes, such as six scanning lines, to accumulate the scanning results of the lower track.

The decoding of the S/A characters on each scanning line not only ensures proper alignment of bits in the six-fold redundancy of marker reading along the lower track, but the bit positions in registers 27 are also aligned with the corresponding bit positions in registers 25, as far as transverse alignment of the markings in a character are concerned. This way, lower track reading and upper track reading is brought into proper mutual registry transverse to the track extension.

After scanning of the data field has been completed, digital representation of the six-fold redundancy in the six registers 25, and the correspondingly redundant digital representation of the markers in the lower track are held in the six registers 27. The evaluation and decoding of this multi-bit/multi-character information proceeds as follows.

A circuit 30 provides for readout control and furnishes a sequence of clock pulses, by means of which the contents of the registers 25, 27 are stepwise shifted to the output sides thereof. An OR gate 31 with six inputs is coupled to the six outputs, respectively of the six registers of store 25. An OR gate 32 has its six inputs coupled respectively to the outputs of the six registers 27. This then establishes two data channels, one for each data track.

The OR gates are of the weighted variety, requiring for example more than three bits representing a marker from three different scanning lines before recognizing and passing a single bit in representation of a marker. Ideally, all six bits from scanning the same track should always be equal (so that and-ing would be proper) but, in view of possible defects in the printing, that is not necessarily the case so that, e.g., the majority principle should be used. The circuits 31 and 32 can thus be constructed as algebraic signal adders with threshold outputs, requiring, e.g., at least three or four particular marker bits to produce one common marker bit as output. Weighted OR gates are realized, for example, relatively simply, as shown in FIG. 2*b*, with current summing on basis of plural inputs at a point whose potential drops with increasing number of inputs until the switching level of the threshold device has been reached.

The effect of a weighted OR gate can best be understood with reference to FIG. 2*a*. The figure shows a somewhat distorted vertical bar, which is part of a character; ink may have run during printing or may have been smeared thereafter. The dash-dot lines denote six different scanning passes across the bar. The video signal for each pass produces a marker bit at a length about equal to the passage of the scanning spot across dark bar portions. It can be seen that in the upper two passes and during the lower two passes, these marker bits have about the correct "bar width." However, the two middle scanning lines result in the production of two marker bits that are actually too wide.

Now, as the six signal trains are combined in a weighted OR configuration, the two premature marker bit portions of the middle scanning lines are not effective in the algebraic signal summing process. The resulting, weighted OR'd marker bit will have width as indicated by the two double arrows. This way, certain imperfections are being in effect removed to avoid, for example, recognition of a locally premature leading marker edge. A locally extended trailing edge is analogously suppressed.

Two signal trains are derived from gates 31 and 32 and each train is fed to two differentiating circuits; these are 33 and 34, as to the output of gate 31, and circuits 35 and 36 are provided to receive the output of gate 32. The circuits 33 and 35 each provide a pulse spike in representation of the leading edge of a marker pulse from gate 31 or 32, and circuits 34 and 36 provide pulse spikes in representation of the trailing edge of a marker pulse.

In accordance with a first embodiment of the invention, the circuits 33 to 36 are selectively enabled and disabled by the circuit 30. The circuit distinguishes a leading edge mode and a trailing edge mode. The former is represented by a mode signal L; the latter by a mode signal T. The contents of registers 25/27, as processed in the weighted OR circuits 31/21, are processed further; first, via circuits 33 and 35 in the leading edge mode, and later all data bits are processed again by means of circuits 34 and 36 in the trailing edge mode.

Registers 25/27 are of the recirculating variety, so that their content is not erased when shifted to the output, but all bits are recirculated and occupy again the same position after the content of the registers has been clocked out completely. Therefore, in the first or leading edge mode, all markers are represented by their leading edge pulses as taken bit by bit from circuits 33 and 35. Subsequently, in the trailing edge mode, all markers are represented, now by their trailing edges and through corresponding spikes developed by differentiating circuits 34 and 36.

The outputs of circuits 33 and 35 are OR'd (gate 37) and the first pulse to appear in each instance sets a monostable multi-vibrator 38. The multi-vibrator 38 furnishes a delayed clock; there is one such clock pulse for each spike regardless from which track it has been derived. The purpose of this delay is to provide for deskewing between upper and lower track information, because the upper and lower track information is not necessarily presented in precise synchronism; the leading edge of a marker that traverses both tracks is not necessarily presented by two synchronous spikes for reasons of skew.

A one bit storage is provided in the two channels, by means of two flip-flop stages 40 and 41; together these flip-flops can be construed as a two-bit, deskew assembly register. Deskewing is necessary, as the scanning lines may not run completely parallel to the tracks (another reason for the redundancy reading of each track). After the delay as established by monostable element 38 has run, the bits are set into two, three stage registers 42 and 43. After three clocks from circuit 37/38, a complete character should be assembled in the two registers 42 and 43, because each character has six bit positions of which four must be occupied by marker bits.

Considering the data of the type shown in FIG. 1, one can see that, except for "1" and "0," each character is not only composed of four vertical markings in four out of six available positions (that is true also for "1" and ")"), but there is always at least one marking per two parallel marking positions across the two tracks. This way, self clocking can readily be provided, because any two transversely aligned bit positions in the two tracks include at least one marker bit, and that is true for each of the three serial —two bit parallel positions in a character. The same is not true for "0" and "1." If the self clocking scheme were used without modification, both registers 42 and 43 will hold 011 after reading of a decimal "1" and after reading of a decimal "0" character.

A decimal "0" can be distinguished from a decimal "1" by monitoring whether after the first two markers or "1" bits enterd in each register, "0" or space bits are present in both flip-flops 40/41 for a delay equivalent to one marker position delay which is, e.g., one shift clock pulse period (30). If so, the character is a decimal "0," provided two markers or "1" bits are again presented by register 40/41 thereafter. Circuit 44 accordingly detects two parallel "ones" in the first stages each of registers 42 and 43, and whether two zeros or two ones are provided after a certain delay. If one or the other instance is the case, circuit 44 provides signal distinguishing the (110;110) combination in registers (43;43) as a decimal one or a decimal zero. However, if the first two "ones" as representing a pair of transversely aligned markers, actually pertain to a decimal "2" or a decimal "5." the next ensuing decoding process will proceed normally.

A circuit 45 with six appropriate inputs is connected to the six outputs of registers 42 and 43 in parallel and provide 406 to binary (or, strictly, to BCD) conversion. If one writes the matrix as defined by the two, 3 stages each registers as (42;43), the code conversion is as follows:

| | | | |
|---|---|---|---|
| 110;110 | 0000 | (0) | Using circuit 44 to provide the distinction |
| 110;110 | 0001 | (1) | |
| 111;100 | 0010 | (2) | |
| 001;111 | 0011 | (3) | |
| 111;001 | 0100 | (4) | |
| 110;101 | 0101 | (5) | |
| 100;111 | 0110 | (6) | |
| 011;110 | 0111 | (7) | |
| 011;101 | 1000 | (8) | |
| 101;011 | 1001 | (9) | |

Each conversion step, as provided by the decoder 45, establishes a BCD output at the four output lines 46 plus a character decode clock pulse R (line 47) shifting the newly encoded BCD character into the four input stages of four bit parallel, $m$-character serial shift register assembly 50, wherein $m$ is the number of characters per data field. The signal in line 47 is also used to erase the content of registers 42, 43. Each pulse R in line 47 causes also each of the other BCD characters in register 50 to be shifted down by one character position accordingly.

After the content of registers 25 and 27 has been processed in that manner and in the leading edge mode, that content is processed again, now in the trailing edge mode. The completion of $m$-decodings produced $m$ BCD characters in register 50 and that completion can be used as a trigger for the readout control 30 to enable trailing edge mode signal T, while disabling the signal L. Accordingly, trailing edge differentiating stages 34 and 36 are enabled while circuits 33,35 are disabled. As a consequence, spikes are produced for each trailing edge of a marker as represented by a marker bit on the output side of gate 31 or gate 32. This, then, is the equivalent of detecting the leading edges of the markers if they had been scanned in the reverse.

These spikes, trailing edge spikes, are now processed in and by the circuitry 37, 38, 40 to 47 in the same manner described previously. However, lines 46 and 47 are now coupled to a second set of registers 51, corresponding to registers 50 and being enabled for storage in the trailing edge mode only. Registers 50 are disabled and will not receive further inputs in that mode. Accordingly, the 406 characters of the data field as now represented by trailing edge marker spikes are decoded and BCD re-encoded again and stored sequentially in registers 51.

After completion of decoding/re-encoded on basis of the trailing edge spikes, the contents of registers 50/51 are externally clocked out of the registers, and character for character is applied to a comparator 52. When the comparator senses parity or equally, one set of four-bit outputs, e.g., the one from registers 50 are fed to an external device for recording and/or display. It can be seen that in case of proper printing, clean labels and flawless readout, the characters as decoded should be identical. In the following, we shall now consider various defects of the label and how the circuit recognizes them and/or compensates for them and we shall discuss later supplementary circuitry for improving the capability of the circuit to detect information even though there is heavy obscuring.

The separate processing of leading and trailing information obviates the need for actually scanning the data field forwards and backwards so as to obtain redundancy reading or re-reading of a character in case of misprints. It should be noted that in the chosen four-out-of-six code, not all possible combinations are used and errors resulting from dislocated bars or resulting from ink spreading may lead to two different readings on forward and backward scan, now represented by different read results when leading and trailing edges are processed separately. Also, a rather strong skew between scanning lines and track extension may result in an apparent phase shift between the bars as read from upper and lower track.

By way of example, a "4" has three bars in the upper track, one in the lower track. A dirt spot, misprint, ink spreading or the like may have extended the single lower bar so that upon forward reading it may appear as if there was a bar in the lower track under the middle bar in the upper track. There is no such legal character which has such a code. It should be noted that the decoder 46 may, for example, issue a particular error character (such as a four bit binary number >9) when encountering an illegal character.

As a consequence, comparator 52 will issue a signal when encountering a correct BCD encoded character in one register and the error character in the other register. It is optional whether or not the output proceeds (arbitrarily) by displaying and/or recording the output of register 50 in that case, together with an indication from comparator 52, indicating possible error of one character. Alternatively, the output of registers 51 for that instance may be recorded and/or displayed as an alternative. In case of an illegal character in one channel, a legal one in the other, the latter may well be assumed correct so that the illegal interpretation can be ignored.

Another feature for error elimination has been already described. The fact that each track is scanned in plural lines eliminates missing of characters if there is a local ink spread or too little ink in a portion of a bar. By requiring recognition of a bar in more than one, but less than all scanning lines for one track, the effect of these print defects is eliminated.

More serious is soiling or ink spreading between two bars in direction of extension of the tracks, as shown for example in FIG. 3*a*. These two bars are presumed to pertain to a regular four-bar character. Under such conditions, there will be only a leading edge pulse of one bar and a trailing edge pulse of the other bar. If the blackening of the space between these bars is extensive, not even the multiple line reading will compensate this error. Such a character will produce not enough readback signals. There will be, e.g., only three "ones" for this one character for forward reading and three "ones" in different positions upon reverse reading. As a consequence, decoder 45 will not respond to either case and may produce error characters for both registers 50, 51. However, the circuit can be supplemented or modified to eliminate that kind of error.

Rather than operating in two alternative modes to simulate forward and backward reading and to accumulate the bits for each character separately for each mode, a circuit as shown in FIG. 4 can be used, wherein the leading and trailing edge signals are combined prior to character assembly and decoding. The circuit could be interposed between gate 31 and the one bit store 40 of FIG. 2, and another one can be interposed between circuits 32 and 41, replacing the particular mode controlled devices 33 to 36.

Leading and trailing edge differentiator 33' and 34' are respectively analogous to elements 33 and 34 except that they are not subject to mode control, but operate in parallel. In other words, each marker signal as generated in circuit 31 (and 32) is differentiated on leading and trailing edge during one and the same readout run of stores 25 and 27.

The leading edge differentiation output spike as produced in 33' is delayed by a period equal to the bar width using, e.g., a monostable multi-vibrator 39. The output spikes of multivibrator 39 and of trailing edge differentiator 34' are fed to an OR gate 391. As a consequence, each trailing edge of a marker can be recognized and represented by two pulses, one being the delayed leading edge spike, the other one being the directly differentiated trailing edge. Each marker is, therefore, represented twice under normal circumstances; namely, by a trailing edge pulse itself and by a concurring, delayed leading edge pulse. However, by operation of the OR gate 391, just one such spike is needed to recognize a marker. The outputs of gate 39 are used (for one track), and due to the concurring processing and combining of leading and trailing edges, only one set of registers (e.g., 50) is needed here.

Looking at FIG. 3, one can see now the pulses as they are developed in the case of an obliterated spacing between two markings. The leading edge of the first bar produces a spike (*3b*), and the delay results in a phase shifted spike (*3c*). That spike should concur with a trailing edge spike of the first bar, but none is produced because of obliterated contrast; nevertheless, the OR gate 39 does provide a trailing edge spike for that first marker, even though it is a simulated one. The second bar does not have a recognizable leading edge, so that neither a corresponding spike, nor a delayed, leading edge spike is produced. The second bar, however, has a recognizable trailing edge and a corresponding pulse is produced (FIG. *3d*) and outputted by gate 391. Thus, the necessary number of (two) pulses is produced, and the decoding process will proceed unaware of the obliteration.

It will be appreciated that the circuit of FIG. 2 will merely register error characters in both modes when the space between two vertical bars in the same track is obliterated, such as shown in FIG. *3a*, while the modification of FIG. 4 will simply register an error character when, for example, the single bar in the lower track for a "4" is extended along the track by ink spreading, dirt or the like. The same is true for the lower open loop of the "5" or the closed loop for the "9."

The character recognizing capabilities of the system are improved if the circuit of FIG. 4 is used to replace only element 34 of FIG. 2 (leaving 33) and, if the entire circuit of FIG. 4 as so inserted is operated in the trailing edge mode while 33 operates in the leading edge mode as before. In other words, the leading edge mode proceeds as described before with reference to FIG. 2, but the trailing edge mode has trailing edge pulses OR'd with delayed leading edge pulses. Now the probability is enhanced that rather than just producing error characters, the double processing as described in FIG. 2 will in some instances yield one correct and one error character, and then the correct one is taken as the desired readout result.

Turning now to the embodiment of FIG. 5, the circuit illustrated here has the particular circuit 21 for furnishing the two level video signals. Circuits 20, 22, 23 and 24 are also the same as in FIG. 2 and are not repeated. The particular embodiment differs in that the effect of dirt spots, ink smudges, etc., are in parts already eliminated in the output of contrast logic 21.

The individual line scan signal from unit 21 is already subjected to leading edge-trailing edge differentiation by circuits 63 and 64, corresponding in function to the several differentiating circuits mentioned above. The leading edge differentiating circuit 63 triggers a monostable device 65 which issues a signal having duration slightly larger than the time corresponding to a vertical bar width traversal during scanning. That device 65, however, does not issue a trailing edge spike (as devices 38 and 39 do); rather, the output of device 65 is fed as a "window" signal to an AND gate 66. The output of trailing edge differentiator 64 is fed to the other input of gate 66 so that a trailing edge signal is recognized only when following a certain period after the leading edge, corresponding to a correct bar width, but also permitting recognition of a contrast bar that is a little thin.

One can readily see that a vertical data and character bar is recognized only when not too wide. In other words, thick dirt blotches, and running ink spots, as shown in the middle portion of FIG. *2a*, are not recognized at all. Take a rather mutilated character, such as a "5" shown in FIG. 6, with a thick dirt spot or ink blot right inside of the loop. The twelve dashed lines indicate again scanning lines. Under the stated operating conditions, the left-most vertical bars in the upper track is probably recognized only in the first and in the fifth and sixth scanning line, while the left-most vertical bar in the lower track is recognized only in the last and in the next to the last scanning line. The right-most bar in the lower track is recognized in every track in spite of ink failure, though the two middle lines may exhibit such low contrast that the contrast logic does not respond, or the window is not yet up when the trailing edge pulse occurs already.

Nevertheless, in each of the tracks there is at least one scanning line which recognizes a marker bar. The stores 25,27 are designed to store these marker bits which actually represent the trailing edges of those contrast bar portions, which passed the width test and were found not too wide. It can readily be seen that thick dirt spots are completely suppressed by this circuit. Each of the trailing spikes as stored in devices 25 and 26 actually acquires a certain length by operation of input clocking into the register. The registers and their shift clock should be externally synchronized with the scanning, and the clock pulses for registers 25, 26 should not be derived from the data itself.

Gates 61 and 62 in this case may not be of the "weighted or" variety at all, or only at a very low level. For example, a data bar may require recognition by and in at least two scanning lines. The outputs of gates 61 and 62 may feed directly into register assembly 40 to 43 with deskew clocking by circuit 37/38 as before. Of course, only one accumulator 50 is needed in this case.

One can see from the foregoing that upon deriving leading type, trailing-edge signals from the contrast bar during different phases of signal processing and by combining the results in various ways, it is possible to eliminate the effect of many printing imperfections or dirt spots, etc. Each of these methods provides error recognition and correction for a somewhat different range of errors. The circuit of FIG. 5, for example, will recognize as completely erroneous a character in which, e.g., because of running ink one bar has been widened beyond the range covered by window generator 65/66. This is not true for the circuits described earlier, but depends on the tpye, extent, and location of the additional ink.

One can see that the basic configuration of the circuit involves numerous similar parts and the circuits of FIGS. 2, 4 and 5 can actually be combined differently by mode control with parts having the same numeral being used always, but the several leading/trailing edge circuits are placed into and out of the circuit, and the same data field is or can be re-read and/or the read result is repeatedly processed so that at least one data process operation involving a partially obliterated character produces a legal decode result. This way reading and read processing is repeated but from a different basis in each instance until either at least one legible character has replaced a possibly repeated provided error character or until all possibilities have been exhausted.

The invention is not limited to the embodiments described above but all changes and modifications thereof not constituting departures from the spirit and scope of the invention are intended to be included.

I claim:

1. In an apparatus for reading contrasting information defined by contrasting markings of particular dimensions and defining characters, the markings arranged in spaced apart relation in at least one track, while extending transverse to the track, the apparatus including means for optically scanning along scanning lines traversing the markings, the apparatus further including optical pick-up means for providing a read signal representing the contrasts along said scanning lines, the improvement comprising:

first circuit means connected to be responsive to said read signal and providing first signals representative of passage of the scanning across leading edges of the contrasting markings;

second circuit means connected to the first circuit means and delaying each of the first signals by a period about equal to a period of scanning time covering the width of the markings;

third circuit means connected to be responsive to said read signal and providing second signals representative of passage of the scanning across trailing edges of the markings;

logic OR-circuit means combining the delayed first signals and the second signals to obtain representation of the markings; and decode means connected to receive the combined signals to obtain a decoding.

2. In an apparatus as in claim 1, and including second decode means connected to receive said first signals to obtain a second decoding; and means for comparing the results of decoding by the first and second decode means to detect errors.

3. In an apparatus for reading contrasting information defined by plural markings arranged in at least one track along a first direction in a data field and extending individually in a second direction transverse to the first direction, comprising:

first means for scanning the markings in plural parallel scanning lines in the first direction;

pick-up means responsive to said scanning and providing read signals;

storage means for storing the read signals of sequential scanning lines, so that signals representing data field read out for corresponding positions as aligned transversely to the direction of scanning are stored for presentation in parallel by the storage means upon retrieval;

third means for processing the read signals in parallel as stored and as having resulted from scanning in the plural scanning lines, and identifying each marker on the basis of coincident signal portions having resulted from passage over the same marker in different ones of said plural scanning lines, but not necessarily all of the scanning lines fourth means included in said third means for establishing criteria of accepting and rejecting signals as representing passage of scanning over a marking, including the rejection of a signal portion in a single line that represents passage over an edge of a marking while signals in said corresponding positions in other scanning lines do not indicate such passage and means for decoding markers as identified by the third means on basis of the criteria established by the fourth means.

4. In an apparatus as in claim 3, including means separately responsive to leading and trailing edges the signals representing passage of scanning across the edges of a marker as extending in the second direction, the fourth means responsive to whether a trailing edge follows within a predetermined period of a leading edge.

5. In an apparatus as in claim 1, and including means separately responsive to leading and trailing edges of the signals representing passing of scanning across the edges of a marker as extending in the second direction, and providing signals separately identifying each marker accordingly, the decoding means decoding the markers twice, once on basis of the leading edge signals and again on basis of the trailing edge signals.

6. In an apparatus as in claim 1, and including means separately responsive to leading and trailing edges of the signals representing passage of scanning across the edges of a marker extending in the second direction;

means for delaying each leading edge signal corresponding to a period equal to regular occurrence of a trailing edge following a leading edge; and means for combining the delayed leading edge signals and the trailing edge signals to obtain representation of a marker on basis of either or both, the decoding means responsive to the combined signals.

7. In an apparatus for reading contrasting information defined by contrasting markings of particular dimensions defining characters and being arranged in a first direction along two tracks while extending in a direction transverse to the first direction, each character having at least one marking extending across both tracks, the apparatus including means for optically scanning along a plurality of scanning lines traversing the markings in each track at least approximately in the first direction, the apparatus further including optical pick up means for providing a single read signal train representing scanning along each scanning line in serial sequence, the improvement comprising:

first circuit means connected to be responsive to said read signal and serially storing the read signal, separately for the scanning lines of each track;

second circuit means connected to the first circuit means and providing plural read out signal trains of the read signal as stored and concurrently for the read signals of scanning lines which covered the same track;

OR-circuit means for combining the read signals as read out concurrently by weighted OR-ing to eliminate local distortions of the markings as represented in the read signals by too early or too late representations in the read signal upon passing across edges of the markings during scanning;

third circuit means connected to receive the OR'ed signals, separately for each track and providing a first signal representative of passage of the scanning across leading edges of the contrasting mearkins;

fourth circuit means connected to be responsive to said OR'ed read signals and providing second signals representative of passage of scanning across a trailing edge of a contrasting marking, the third and fourth circuit means providing these first and second signals separately for the two tracks;

fifth circuit means including data decoder means and connected to the third and fourth circuit means to receive said first signals and said second signals for the markings of each character as extending across the two tracks and as redundant identification of presence of said character in simulation of reading by scanning in the first direction and of reading, again in the opposite direction; and means for processing said first and second signals separately to obtain decoded information.

8. Apparatus as in claim 7, and including control means to obtain a train of said first signals to be decoded by the decoder means, and to obtain another train of said second signals to be decoded separately by the decoder means; and means for separately storing the results of the decoding of the first and second train signals.

9. Apparatus as in claim 1, the third and fourth circuit means operating concurrently, and including delay means connected to the third circuit means to provide a delayed first signal, the fifth circuit means including additional circuit means to combine the delayed first signal and the second signal.

10. Apparatus as in claim 9, the additional circuit means being a logic gate to monitor whether a second signal occurs within a predetermined period following a first signal.

11. Apparatus as in claim 9, the additional circuit means being a logic gate to provide a single signal train for the delayed first and the second signals.

12. In an apparatus for reading contrasting information defined by contrasting markings of particular dimensions defining characters and being arranged in a first direction along two tracks while extending in a direction transverse to the first direction, each character having at least one marking extending across both tracks, the apparatus including means for optically scanning along a plurality of scanning line traversing the markings in each track at least approximately in the first direction, the apparatus further including optical pick-up means for a single read signal train representing scanning along each scanning line in serial sequence, the improvement comprising:

first circuit means connected to be responsive to the read signal and providing first signals representative of passage of the scanning across leading edges of the contrasting markings;

second circuit means connected to be responsive to the first signals and providing gating signals respectively following each said first signal by a specified period and lasting for a specified duration;

third circuit means connected to be responsive to the read signal and providing second signals representative of passage of the scanning across trailing edges of the contrasting markings;

fourth circuit means connected to determine whether or not each of the second signals coincides with a gating signal and providing an output accordingly;

storage means connected for storing the outputs as provided by the fourth means pursuant to sequential scanning lines and storing specifically outputs in corresponding positions for pralleled outputting of stored outputs upon retrieval and as produced by the first through fourth circuit means in representation of repeated scanning across the trailing edge of the same marker by said sequential scanning lines;

OR-circuit means for combining parallelly outputted stored outputs of the storage means by weighted OR-ing, requiring coincidence of less than all but more than one output presented in parallel; and decode means for decoding the signals as combined by the OR-circuit means.

* * * * *